June 19, 1956 S. S. VELLA ET AL 2,750,977
APPARATUS FOR CLIPPING TOPS FROM ONIONS
Filed May 20, 1953 5 Sheets-Sheet 1

INVENTORS
SALVATORE S. VELLA
PATSY J. MUSSO
FRANK E. MUSSO
CHARLES S. MUSSO
BY Thomas F. Healy
ATTORNEY June 19, 1956   S. S. VELLA ET AL   2,750,977
APPARATUS FOR CLIPPING TOPS FROM ONIONS
Filed May 20, 1953   5 Sheets-Sheet 2
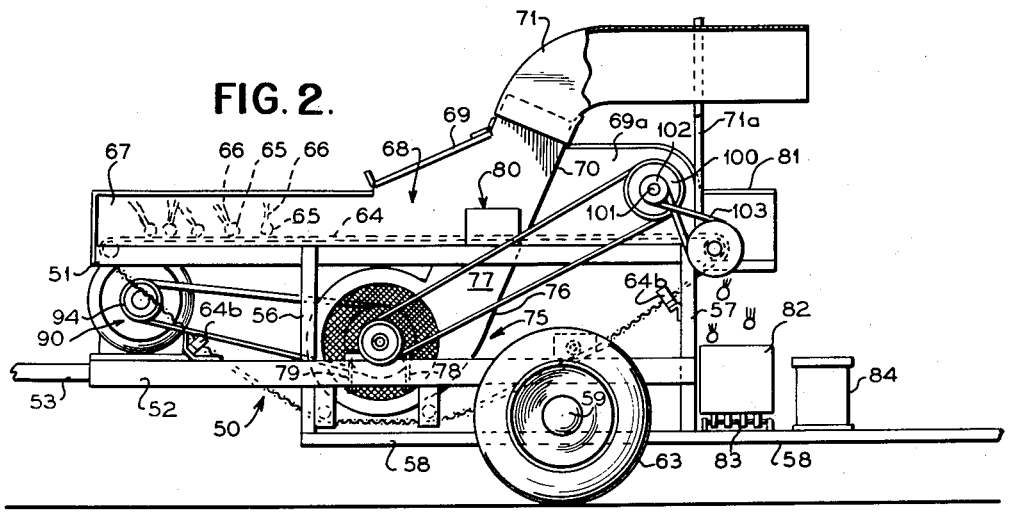
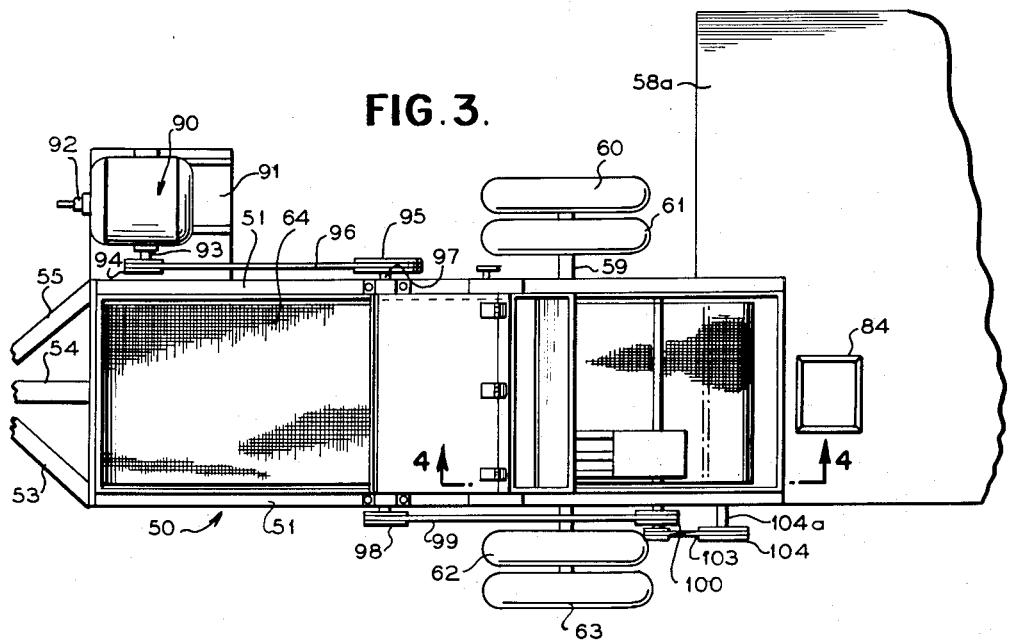
INVENTORS
SALVATORE S. VELLA
PATSY J. MUSSO
FRANK E. MUSSO
CHARLES S. MUSSO
BY Thomas F. Healy
ATTORNEY

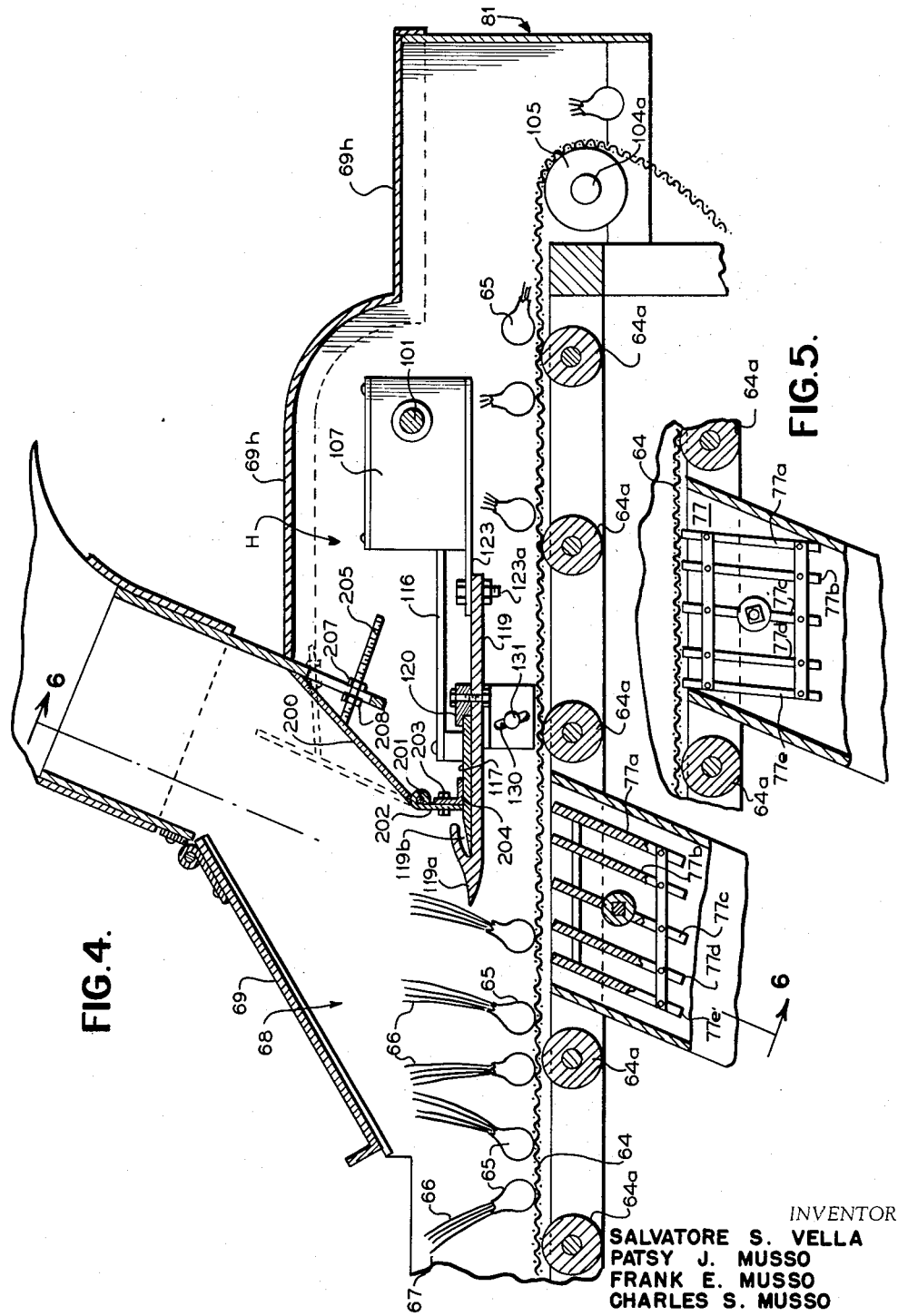

June 19, 1956  S. S. VELLA ET AL  2,750,977
APPARATUS FOR CLIPPING TOPS FROM ONIONS
Filed May 20, 1953  5 Sheets-Sheet 4

INVENTORS
SALVATORE S. VELLA
PATSY J. MUSSO
FRANK E. MUSSO
CHARLES S. MUSSO

BY Thomas F. Healy
ATTORNEY

June 19, 1956  S. S. VELLA ET AL  2,750,977
APPARATUS FOR CLIPPING TOPS FROM ONIONS
Filed May 20, 1953  5 Sheets-Sheet 5

INVENTORS
SALVATORE S. VELLA
PATSY J. MUSSO
FRANK E. MUSSO
CHARLES S. MUSSO

BY Thomas F. Healy
ATTORNEY 2,750,977
Patented June 19, 1956

United States Patent Office

2,750,977
APPARATUS FOR CLIPPING TOPS FROM ONIONS

Salvatore S. Vella, Patsy J. Musso, Frank E. Musso, and Charles S. Musso, Albion, N. Y., assignors to Air-Flo Onion Clipper Mfg. Co., Inc., Albion, N. Y., a corporation of New York Application May 20, 1953, Serial No. 356,206

6 Claims. (Cl. 146—83)

The present invention relates to an apparatus for clipping tops from onions or the like.

The present application is a continuation-in-part of our copending application Serial No. 194,208 filed November 6, 1950, and now abandoned.

An object of the present invention is the employment of positive air pressure in an onion top clipping machine, which air may be selectively directioned to cause the onions in various stages of maturity to assume a position in motion where the onion tops extend upwardly for the top clipping operation, and to provide means to efficiently and effectively separate the severed onion tops in such a manner that there is no clogging of the top clipping machine.

We are aware that we are not the first to invent an onion topping machine, and more particularly an onion topping machine which employs air in the top clipping operation. Reference is made to U. S. Patent No. 926,286, issued June 29, 1909. This patent, No. 926,286, teaches the employment of a suction device to draw the onion tops downwardly into a severing position.

Reference is also made to U. S. Patent No. 1,379,049, issued May 24, 1921, which relates to an onion topping machine employing a partial vacuum in the onion clipping operation. Attention is also directed to the U. S. patent to Lenz No. 2,553,519 and the Netherlands Patent No. 52,358.

Our onion topping apparatus is an improvement over the onion topping machines of the prior art, in the provision of positive air pressure means sufficient to cause the onion tops to stand upright in movement over a conveyor, wherein the direction of the air may be selectively changed so that the green or withered tops may be severed from the onions as they pass under an onion top clipping assembly.

The onion top clipping apparatus of the present invention is particularly adapted to be employed with the digging and harvesting apparatus shown in the U. S. Patent No. 2,546,411 issued to Salvatore Vella. However, it may be employed with any conventional digging apparatus sold commercially today.

The top clipping apparatus of the present invention has many advantages over the machines of the prior art. First, in harvesting vegetables like onions, there is only a limited amount of time in which to get the onions out of the ground, top the same, and get the topped onions to market. With our apparatus, the time of harvesting and topping onions with a machine is extended due to the feature of the adjustability of the direction of the air under pressure to compensate for the state of growth of the onion tops. If the onion tops are green the air under pressure is adjusted to stand the onions upright for the top cutting operation. If the tops of the onions are withered the air under pressure can be selectively adjusted to bring the withered onion tops into the proper position for the top cutting operation. Another advantage of our machine is the provision of a baffle, or the like, to change the direction of the air under pressure after it leaves the first air adjusting means to bring about a more efficient separation of the severed tops without building up eddy currents to clog the machine with cut tops.

One of the main features of the present invention is the provision of means for clipping the tops from onions wherein the onions during the clipping operation are not subjected to bruising jolts, and further wherein the green or withered tops of the onions are clipped in such a manner that the outer skins of the onions are not mutilated or broken.

Another object of the present invention is to provide in an onion top clipping apparatus, the combination of air pressure means to put the onions into proper top cutting position, adjustable air directing means to selectively vary the angle at which the air under pressure strikes the onions to position the tops for the top cutting operation, and adjustable air directing means to selectively change the direction of the air carrying the severed onion tops.

Still a further object of the present invention is to provide in an onion top clipping apparatus, the combination of, air pressure means to put the onions into proper top cutting position, adjustable air directing means to selectively vary the angle at which the air under pressure strikes the onions to position the tops for the top cutting operation, means to cut the tops from the onions disposed wtihin a hooded section, adjustable air directing means to selectively change the direction of the air carrying the cut onion tops, and means to adjust said top cutting means relative to the position of the onion tops being processed.

Yet another object of the present invention is to provide in an onion topping apparatus, a conveyor chain for onions, means to drive said conveyor chain, a knife assembly including reciprocating cutting blades disposed in the path of said conveyor chain, means to reciprocate said cutting blades, air blower apparatus having an air outlet tube below said conveyor chain whereby onions passing over said air outlet tube are subject to positive air pressure sufficient to cause the onions to stand with the tops extending upwardly, said air outlet tube being positioned below said knife assembly, vanes disposed in said air outlet tube, a handle to change the pitch of said vanes, means to operate said air blower apparatus, and a duct disposed above said conveyor chain and in such relation to said knife assembly and said air outlet tube to receive the tops severed from the onions passing under said knife assembly.

A further object is to provide in an onion topping apparatus, a conveyor chain for onions, means to drive said conveyor chain, a knife assembly including reciprocating cutting blades disposed in the path of said conveyor chain, means to reciprocate said cutting blades, air blower apparatus having an air outlet tube below said conveyor chain whereby onions passing over said air outlet tube are subject to positive air pressure sufficient to cause the onions to stand with the tops extending upwardly, said air outlet tube being positioned below said knife assembly, adjustable air directing means disposed in said air outlet tube, and means to operate said air blower apparatus.

Still another object is to provide in an onion top clipping machine, an endless perforated conveyor for onions, means to drive said conveyor, air blowing means disposed below said conveyor and having an air outlet tube over which said conveyor moves, adjustable air directing means disposed in said air outlet tube, means to operate said air blowing means, an onion top clipping assembly including a reciprocating cutter bar carrying cutting blades and being disposed in the path of said conveyor rearwardly of said air outlet tube, and means to reciprocate said cutter bar and blades.

Yet another object is to provide in an onion top clipping machine, an endless perforated conveyor for onions, means to drive said conveyor, air blowing means disposed below said conveyor and having an air outlet tube over which said conveyor moves, adjustable air directing means disposed in said air outlet tube, means to operate said air blowing means, an onion top clipping assembly including a reciprocating cutter bar carrying cutting blades disposed in the path of said conveyor rearwardly of said air outlet tube, means to reciprocate said cutter bar and cutting blades, and adjustable air directing means carried by said cutter bar to alter the direction of the air after it leaves said outlet tube.

Still another object of the present invention is to provide a top clipping machine comprising, a perforated conveyor for onions or the like, means to drive said conveyor, air pressure means associated with said conveyor adapted in operation to stand said onions with tops upwardly, adjustable air directing means associated with said air pressure means, an onion top clipping assembly in the path of said conveyor, and means to operate said onion top clipping assembly.

A further object of the present invention is to provide a top clipping machine comprising a perforated conveyor for onions or the like, means to drive said conveyor, air pressure means associated with said conveyor and adapted in operation to stand said onions with tops upwardly, adjustable air directing means associated with said air pressure means, an onion top clipping assembly in the path of said conveyor, means to operate said onion top clipping assembly, and adjustable means to change the direction of air under pressure after it leaves said first mentioned air directing means.

Still a further object of the present invention is to provide a top clipping machine comprising, a perforated endless conveyor for onions or the like, means to drive said conveyor, air pressure means associated with said conveyor adapted in operation to stand said onions on the conveyor with tops extending upwardly, adjustable air directing means associated with said air pressure means, an onion top clipping assembly in the path of said conveyor, said onion top clipping assembly including transversely disposed reciprocating cutting blades disposed on a cutter bar, means to operate said onion top clipping assembly including said reciprocating cutting blades and cutter bar, means to adjust said reciprocating cutting blades, and an adjustable air directing baffle carried by said cutter bar.

Another object of the present invention is to provide a top clipping machine comprising, a perforated conveyor for onions or the like, air pressure means associated with said conveyor adapted in operation to stand said onions with tops upwardly, adjustable air directing means associated with said air pressure means, an onion top clipping assembly in the path of said conveyor, and a single power means to drive said conveyor, air pressure means, and onion top clipping assembly.

Yet another object is to provide a top clipping machine comprising a perforated conveyor for onions, air pressure means associated with said conveyor adapted in operation to stand said onions with tops upwardly, adjustable means to change the direction of the air from said air pressure means, an onion top clipping assembly in the path of said conveyor, said onion top clipping assembly including reciprocating cutting blades, means to adjust said reciprocating cutting blades upwardly or downwardly, and a single power means to operate said conveyor, air pressure means, and onion top clipping assembly.

Still another object of the present invention is a top clipping machine comprising, a perforated endless conveyor for onions, means to drive said conveyor, air pressure means associated with said conveyor adapted in operation to stand said onions on the conveyor with tops extending upwardly, an onion top clipping assembly in the path of said conveyor, said onion top clipping assembly including transversely disposed reciprocating cutting blades, means to operate said onion top clipping assembly including said reciprocating cutting blades, and means to adjust said reciprocating cutting blades.

In one of its aspects, the present invention embraces the concept of providing an onion top clipping assembly including positive air pressure means to provide air under pressure sufficient in force to stand onions in movement upright so that the tops are disposed in an upwardly extending position, whereby the tops may be clipped from the onions in movement in said upwardly extending position, and more particularly where means are provided to change the direction of the flow of the air as desired, depending upon whether the onion tops are green, semi-withered or completely withered.

Other and further objects and advantages of the present invention will be apparent from the following description thereof and from the claims appended thereto.

In the drawing wherein like numerals refer to like or corresponding parts throughout the several views:

Figure 2 is a side elevation of the onion topping machine shown in Figure 1 of the drawing;

Figure 3 is a top plan view of the onion topping machine with parts broken away;

Figure 4 is an enlarged sectional view taken along the line 4—4 of Figure 3 in the direction of the arrows;

Figure 5 is an enlarged sectional detail showing the vanes of the air adjusting means of Figure 4 in upright position;

Figure 1:
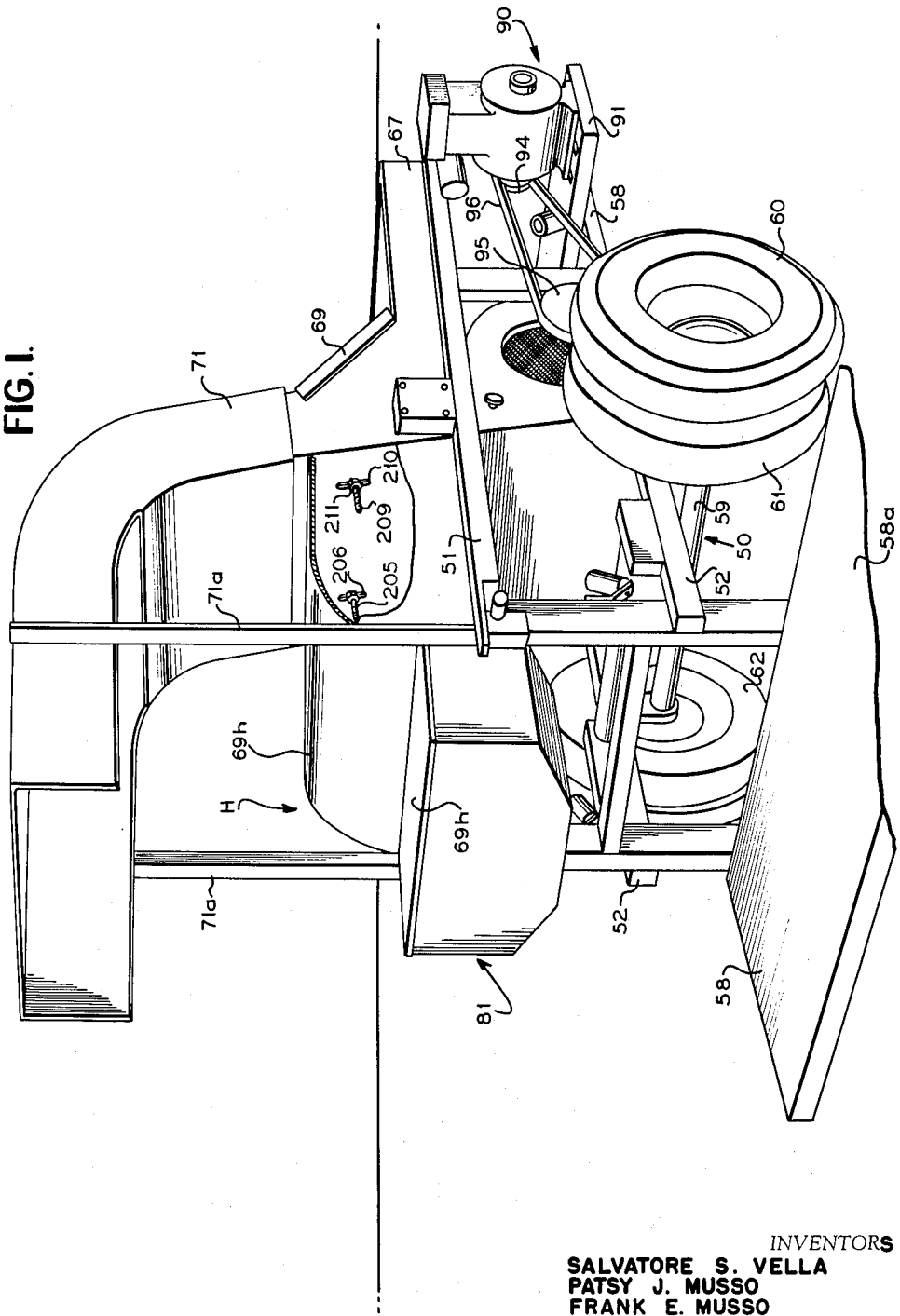
Figure 1 is a perspective view from the rear right side of the onion topping machine employing the features of the present invention.

Referring now to the drawing, the numeral 50 generally indicates the onion top clipping machine embracing the features of the present invention. The onion topper may be employed with an onion digging apparatus of any type, which onion digging apparatus is adapted to dig the onions from the ground and convey them to a point where they are available for the operation of the onion topper. The onion topper 50 generally comprises a frame of rectangular shape having two spaced apart upper longitudinally extending bars 51, and two spaced apart lower longitudinally extending bars 52. There are provided forwardly extending members 53, 54 and 55, which are in the nature of tie rods to tie the onion topper of the present invention to an onion digging apparatus. The framework of the onion topper also includes, in addition to the longitudinally extending bars 51 and 52, vertical struts 56 and 57, which tie the upper side rail 51 to the lower side rail 52 and to a longitudinally extending lower platform 58 which extends rearwardly to a position beyond the main framework of the onion topper machine. The lower side rail 52 is suitable supported to vertical struts 56 and 57 to provide a rigid assembly capable of practical use as an onion topping machine.

The onion topper of the present invention is adapted either for stationary or mobile use. As shown in the figures of the drawing, and more particularly Figure 1, the frame of the onion topping machine is suitably mounted on an axle 59 which extends transversely of the framework of the topping machine and is journaled for rotation in the usual manner. The axle 59 has mounted on the outer end portions thereof double wheels 60 and 61 on the one side, and 62 and 63 on the other side. The particular mounting of the wheels 60 and 61, and 62 and 63 upon the axle 59 is not considered to be an important part of the present invention, and therefore has not been described in greater detail. The only purpose of the wheels is to permit the onion topper to be drawn in the field in combination with the onion digging assembly so that the onions which have been dug may be passed into the onion topper.

As the onions leave the digging apparatus, they are led to the onion topper and onto a horizontally disposed conveyor chain 64 which is an endless conveyor chain having mesh openings of one inch and being adapted to carry onions 65, provided with tops 66 thereover. The onions 65 are moved rearwardly from the forward end of the onion topping machine on the conveyor 64, and are prevented from falling off the sides by side walls 67 which are secured to the upper longitudinally extending side rails 51.

We also provide a hooded section in our onion topping machine, which we have generally indicated by the numeral 68, said hooded section comprising an upwardly slanting wall 69 which is hingedly supported, a slanting wall 70, and two rearwardly extending walls or supports designated as 69a and 69b, it being understood that the hood 68 covers the entire cutting knife assembly and is so constructed and designed with walls at the correct angle so that the tops 66 of the onions, as they are severed by the cutting knife assembly, are able to be blown out of the hooded section into a bottomless duct 71 which is upwardly and rearwardly extending.

As the onions move over the endless conveyor chain 64, they pass over an air blowing apparatus which we have generally indicated by the numeral 75, which air blowing apparatus includes a housing 76, having an air outlet tube or orifice 77, together with suitable means for generating air under pressure, all in accordance with prior art air blowing devices. The air blowing apparatus is supported beneath the conveyor chain 64 as by means of bolts 78 and 79, which suitably secure the housing 76 to the lower longitudinally extending bars 52.

As the onions 65 pass over the air outlet tube 77 which extends transversely of chain 64, the positive air pressure causes the onions to stand upright so that the tops thereof are vertically extending, and the tops remain in this position under the influence of the positive air pressure until they pass into a knife assembly which we have generally indicated by the numeral 80. This knife assembly 80 and its operation will be explained in greater detail hereinafter.

As the onions are topped as they pass rearwardly on the conveyor chain 64, and the positive air pressure causes the cut onion tops 66 to be blown upwardly and rearwardly through tube or bottomless duct 71. The tube or duct 71 is suitably supported intermediate the ends thereof by means of two oppositely disposed uprights 71a.

The topped onions pass under the onion top clipping assembly 80 and are moved rearwardly over the moving endless conveyor chain 64, through housing generally indicated by the letter H into the rear section of the topper which comprises the housing generally indicated by 81, which is open at the bottom where they finally leave the conveyor chain 64 and drop into a crate 82 which is positioned on transversely extending rollers 83, so that when the crate 82 is filled with onions the crate may be rolled to the side to rest upon that enlarged part of the platform 58 which extends to the side and which we have indicated by the numeral 58a. The crate of onions 82 may then be picked up and carried to a suitable place where they may be sent to market. On the platform 58, there is disposed a seat which we have indicated by the numeral 84, which seat is adapted to carry a man who will roll the crates of onions to the side as each crate is filled.

As shown in Figures 1 and 4, the housing H and housing 81 have a common top 69h which is removable.

In order to guard against bruising the onions, the inner sides of the metal walls of housing 81 are carefully padded with rubber or like soft material, and the walls of said housing 81 are disposed to permit the topped onions to drop easily into crate 82.

In operating the endless conveyor chain 64, any suitable power source can be employed, but we prefer to use an 8½ H. P. internal combustion engine which we have indicated generally by the numeral 90. The motor 90 is mounted on a motor mount 91, and may be slid forwardly thereon by the action of a screw which is indicated by the numeral 92. The motor 90 is otherwise suitably mounted on the motor mount 91 and the reason for the small movement of the motor on the mount is to ease the tension on the V belt assembly during the starting operation. As this is a conventional expedient, we have not described in great detail the exact structure employed.

Motor 90 drives shaft 93 and in turn rotates the pulley wheel 94, which is journaled to said shaft 93. Pulley wheel 94 is a 3½" double V pulley turning at 2700 R. P. M. to furnish power to the blower shaft pulley 95 through a V belt 96. The pulley wheel 95 is keyed to a shaft 97 which extends transversely through the frame of the onion topper and is journaled for rotation. The shaft 97 has keyed thereto, on the opposite side of the frame from the pulley wheel 95, a pulley wheel 98 which is connected by means of a belt 99 to a pulley 100 which is keyed to a shaft 101 which drives the knife blade assembly comprising the onion topping mechanism.

On the outer end of the shaft 101 is a pulley wheel 102 keyed thereto, which pulley wheel 102 is connected by means of a belt 103 to pulley wheel 104 which rotates shaft 104a which is keyed to a 6" wooden roller 105, which wooden roller extends transversely across the frame of the onion topping apparatus and is journaled for rotation in such a manner that it moves the conveyor chain 64.

The movement of the endless conveyor chain 64 is facilitated by means of idlers 64a and small guide rollers 64b which are suitably secured to the frame of the apparatus.

Thus it can be seen that the onion topping apparatus receives its motivating power from the motor 90 through the drive shaft 93 which in turn rotates the pulley wheel 94, which in turn rotates the pulley wheel 95 through the belt 96, which pulley wheel 95 being keyed to shaft 97 in turn rotates pulley wheel 98, which through belt drive 99 rotates pulley wheel 100, which in turn rotates shaft 101. The rotation of shaft 101 in turn rotates pulley wheel 102 giving rotary motion to pulley wheel 104 through belt 103. The pulley wheel 104 through shaft 104a rotates the 6" wooden roller head 105, which roller head 105 is padded with rough rubber to operate the conveyor chain 64. Also, the rotation of the shaft 101 causes the operation of the knife cutting assembly, which has generally been indicated by the numeral 80, all in a manner as hereinafter more fully explained.

It is an important feature of the present invention to provide a sufficient air blast to stand the onions upright as they pass through the onion topping apparatus and at the same time have the movement of the conveyor chain 64 such with reference to the air blast that the onions are not moved too rapidly under the onion topping apparatus. We have found that pulley wheel 94 is preferably a 3½" double V pulley turning at 2700 R. P. M. Pulley wheel 95 is a 12" double V pulley turning at 1000 R. P. M. Pulley wheel 98 is a 4" V pulley keyed to the blower shaft and turning at 1000 R. P. M. Pulley wheel 100 is a 9" V-shaped pulley. Pulley wheel 102 is an adjustable V-shaped pulley revolving at 350 R. P. M.

Pulley wheel 104 is a 12" V-shaped pulley to operate the conveyor chain 64, and rotating at 100 R. P. M.

The air outlet tube 77, as more particularly shown in Figures 4 and 5, is provided in the throat thereof with a vane assembly, including vanes 77a, 77b, 77c, 77d and 77e, which vanes are secured to each other so that the vane assembly moves as a unit by the operation of the handle 77f, with the vane assembly being pivotally supported in the side walls of the tube 77 for limited rotary movement and operating in the same manner as a damper structure.

The vanes in the throat of the air outlet tube 77 play a very important part in the present invention in providing means for changing the direction of the air blast as it comes from the blower 75 in such a manner as to accommodate onions having tops of different lengths, or degrees of greenness so that the tops of the onions will be at a suitable height when passing through the onion topping apparatus generally indicated by the numeral 80. It is understood that the outlet of tube 77 lies substantially directly beneath the conveyor chain 64 and in such relationship to the knife assembly 80 that the onions on the conveyor chain 64 are all subject to positive air pressure just before the topping operation.

Figure 6:
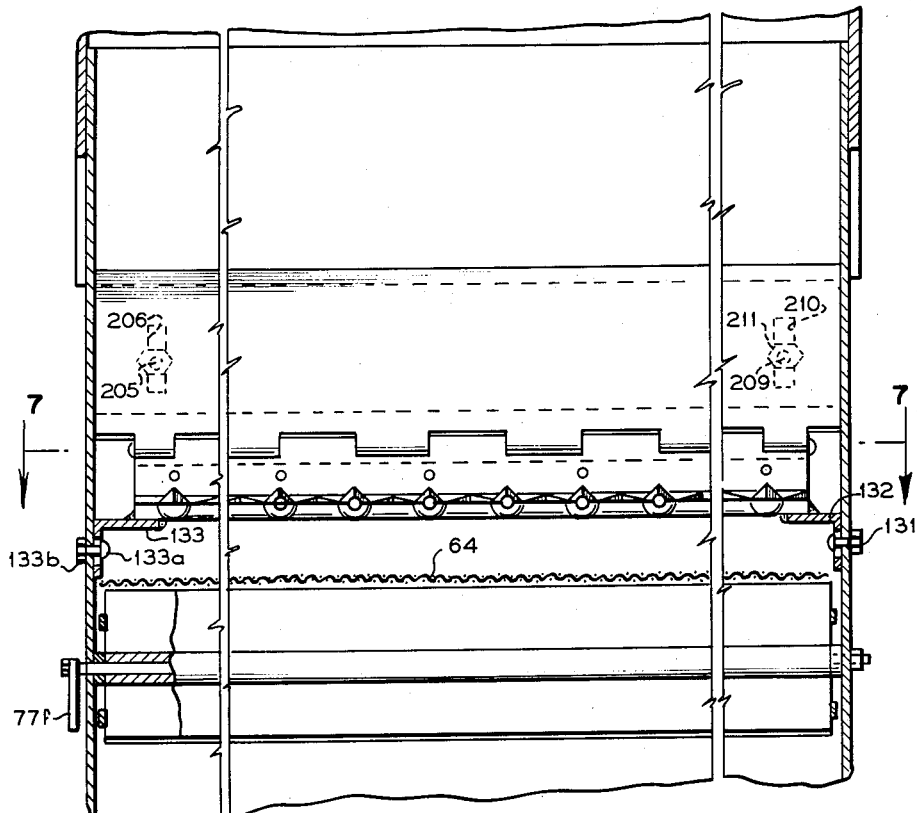
Figure 6 is a sectional view taken along the line 6—6 of Figure 4 in the direction of the arrows.
Figure 7:
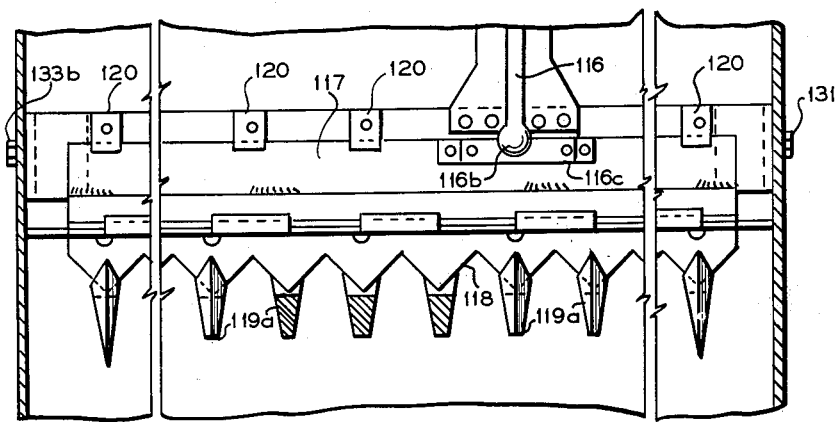
Figure 7 is a sectional view taken along the line 7—7 of Figure 6 in the direction of the arrows.
Figure 8:
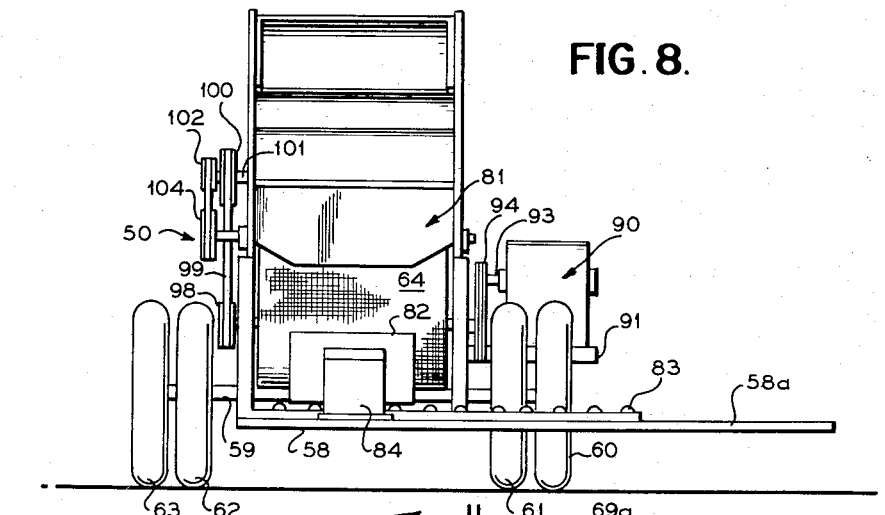
Figure 8 is a rear view of the onion topping machine.

Referring now to Figures 4, 6, and 7 of the drawing, we have set forth the knife assembly which comprises the onion topping mechanism of the present invention.

As pointed out hereinbefore, the pulley wheel 100 is secured to the stub axle 101, which is suitably journaled in the side wall 69a, of housing H, and extends through a bearing 106, which is suitably secured to a box 107 by means of a plate 108 and bolts 109 and 110. The shaft 101 extends within the box 107 and through an aperture in the other side thereof where it terminates, being adapted for free rotation. Secured or keyed to the shaft 101 and rotatable therewith is a cylindrical member 111 having a spiral groove 112 cut therein. Connecting rod 113, having a knob 114 adapted to ride in said groove 112, is disposed within the box 107. The connecting rod 113 is suitably secured, as by a lock nut, at the other end thereof to a vertically disposed pin 115, which in turn is suitably secured to an arm 116, so that reciprocating movement can be translated from arm 113 to arm 116 through pin 115.

Arm 116 extends outwardly from the box 107 through an opening 116a, where it terminates in a ball bearing 116b, which ball bearing is disposed in two sockets to give universal movement, which sockets rest on a small plate 116c, which is secured to the cutting knife bar 117, which knife assembly is provided with cutting blades 118. The movement of arm 116 is translated to plate or bar 117 through ball bearing 116b.

A relatively stationary plate 119 extends transversely across the path of the conveyor chain and is secured to opposite side walls of the topper machine. The plate 119 has bolted thereto small spaced apart metal pieces or projections 120, which projections 120 fit over the movable knife bar 117 to keep the cutting knives from jumping out of place during the operation thereof.

The stationary supporting plate 119 extends beneath the transversely movable knife plate 117, so that the said knife plate rests thereon and is free to reciprocate thereover to move the knife blades 118 backward and forward during the cutting operation. The plate 119 has forwardly extending guard fingers 119a, as best shown in Figure 4 of the drawing. The guard fingers 119a are slotted as at 119b to receive the cutting knives 118, so that the cutting knives during the reciprocating cutting operation move into and out of the slots 119b, in each of the guard fingers 119a. The forwardly projecting guard fingers 119a serve as protection against rocks, heavy dirt, or the like, which may jam the cutting blades 118 and cause damaging thereof, as well as serving as guides for the onion tops to make sure the tops are positioned for clipping.

Figure 9:
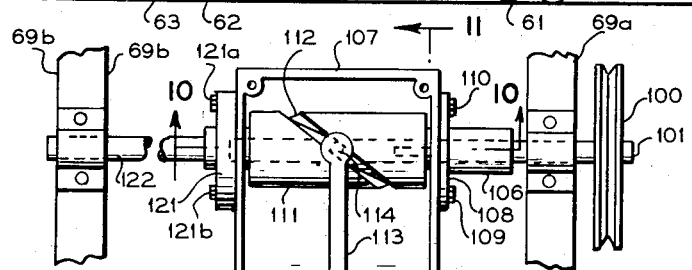
Figure 9 is a plan view of the knife reciprocating mechanism with the cover of the box removed.
Figure 11:
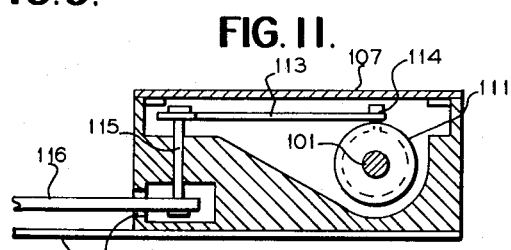
Figure 11 is a sectional view along the line 11—11 of Figure 9 in the direction of the arrows.
Figure 10:
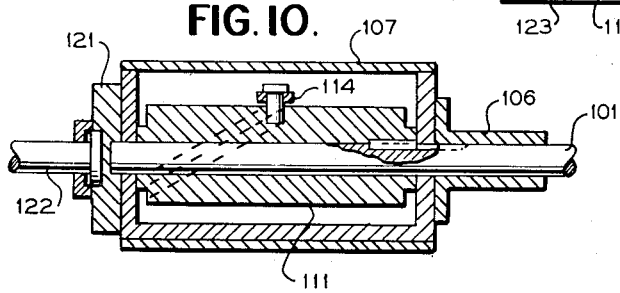
Figure 10 is a sectional view along the line 10—10 of Figure 9 in the direction of the arrows.

Referring again to Figure 9 of the drawing, the box 107 is supported on the other side thereof by means of a plate 121 bolted to the side walls of box 107 by means of bolts 121a and 121b. Attached to the plate 121 is a shaft 122 which is journaled in the side wall of the frame which has been designated as 69b, and is opposite to side wall 69a.

As an additional support for the box 107, we provide a forwardly extending member 123 which is secured to the stationary member 119 by means of suitable bolts 123a.

As the pulley wheel 100 rotates, it in turn rotates the shaft 101, which rotates the member 111, which causes the knob 114 of the arm 113 to ride in the spiral groove 112 cut in the surface of the member 111. Thus an eccentric movement is translated to arm 113, which in turn through pin 115 translates a reciprocating movement to arm 116, which in turn causes a reciprocating movement of the blade carrying plate 117, which in turn reciprocates the teeth 118 between the stationary guard fingers 119a. Thus, when onion tops come between the guard fingers 119a, they are subject to the action of the reciprocating cutting blades 118, which sever the tops from the onions at the desired height, leaving a top of about two inches.

We have provided means to adjust the height of the cutting blades 118 above the conveyor chain 64. The stationary plate 119 is journaled in the side walls in such a manner that it is possible to move it slightly in an arcuate direction through the length of the arcuate slot 130 to raise or lower the knife blades 118, which are permitted some movement because of the universal connection at the ball bearing 116b. Thus it can be seen that the relatively stationary plate 119 and the reciprocating knife cutter bar 117, which rests on the plate 119, can be selectively adjusted within limits either upwardly or downwardly depending upon the height that it is desired to dispose the reciprocating cutting blades 118 above the moving conveyor chain 64.

The blade adjusting mechanism, as more clearly shown in Figure 6 of the drawing, includes a bolt 131 which fits through the arcuate slot 130, which is disposed in an opening in the L-shaped member 132, which in turn is secured to the plate 119. The adjusting mechanism comprises a second L-shaped plate 133, which is secured to the opposite end of plate 119 and operates in the same way as member 132, as by bolt 133a and nut 133b, with bolt 133a being disposed in an arcuate slot. Thus it can be seen that the blade adjusting mechanism comprises two apertured L-shaped plates each of which is secured to the transversely stationary plate 119 at opposite ends thereof so that movement of the bolts in the arcuate slots causes movement of the L-shaped members and in turn the upward or downward movement is translated to the plate 119.

Inasmuch as the shafts 122 and 101 are journaled for some rotation, it can be seen how the box 107 can be tilted upwardly or downwardly with the operation of the blade adjusting mechanisms to thus raise or lower the finger guards 119a and the cutting blades 118 to a desired height as to take care of the upstanding onion tops as they come under the knife blade assembly on the moving conveyor 64.

As another very important feature of our invention, attention is directed to Figure 4 of the drawing to show a baffle plate 200 which extends transversely of the conveyor chain 64 within the housing 68, said baffle 200 being hingedly secured at the lower end portion 201 to an upright plate 202 which is secured by means of a nut and bolt 203 to an L-shaped member 204, which L-shaped member is secured to the cutter bar 117 which is adapted for reciprocal movement. This baffle 200 is adjustable. A threaded rod 205, at one end thereof, is secured to the said baffle 200 by welding or the like.

Threaded rod 205 rides in an elongated vertical slot 206 disposed in wall 70, and the baffle 200 is locked through means of lock nuts 207 and 208, in opposite sides of the elongated opening 206.

A second threaded rod 209, is likewise secured to the rear of baffle plate 200, on the opposite side thereof, which threaded rod 209 is adapted to ride in a second vertical slot 210 disposed in wall 70. Lock nuts are provided to lock the threaded rod 209 in position, one of said lock nuts 211 being shown in Figure 1 of the drawing.

When it is desired to adjust the position of the baffle plate 200, the lock nuts are suitably adjusted on the threaded rods 205 and 209, and said baffle 200 is moved in such a manner as to decrease eddy currents from the air which is blown through the throat of the air blowing means. The baffle 200 is so adjusted with reference to the position of the vanes 77a, 77b, 77c, 77d and 77e so that the tops of the onions are carried through the duct 71 without clogging the machine.

This adjustable baffle plate permits more efficient and effective separation of the onion tops from the topped onions in such a manner that air eddy currents are eliminated as well as back pressure which cause the clogging of the machine with severed onion tops.

Various modifications of the present invention will be apparent to those skilled in the art without departing from the spirit thereof, and therefore we desire to be limited only by the scope of the appended claims.

What is claimed is:

1. An onion topping machine comprising; an endless conveyor chain carried by said machine; an onion topping mechanism on the machine mounted above the conveyor chain and including a knife assembly having reciprocating cutting blades disposed in the path of said conveyor chain; air blower apparatus mounted on the machine and having an air outlet tube disposed below said conveyor chain and in such relationship to said onion topping mechanism that onions passing along said conveyor chain are subjected to positive air pressure sufficient to cause the onions to stand with tops extending upwardly while passing under the said reciprocating cutting blades; vanes mounted in said air outlet tube; a handle associated with said vanes to adjust the pitch thereof depending upon the greenness of the onion tops and selectively to vary the direction of the air under pressure as it leaves the said air outlet tube to strike the onions moving along the conveyor chain; a hood mounted over said air outlet tube and said onion topping mechanism; said hood having an outlet for the severed onion tops under air pressure; said onion top outlet being above said conveyor chain and in such relationship to said reciprocating cutting blades and said air outlet tube so as to be in the path of the air blown through said air outlet tube; a single power means mounted on the machine to operate said conveyor, air blower apparatus and onion topping mechanism; and a power transmission means to operatively connect each of said conveyor chain, said air blower apparatus and said onion topping mechanism with said single power means.

2. An onion topping machine comprising; an endless conveyor chain carried by said machine; an onion topping mechanism on the machine mounted above the conveyor chain and including a knife assembly having reciprocating cutting blades mounted on a reciprocating cutter bar; said onion topping mechanism being disposed in the path of said conveyor chain; air blower apparatus mounted on the machine and having an air outlet tube disposed below said conveyor chain and in such relationship to said onion topping mechanism that onions passing along said conveyor chain are subjected to positive air pressure sufficient to cause the onions to stand with tops extending upwardly while passing under the said reciprocating cutting blades; vanes mounted in said air outlet tube; a handle associated with said vanes to adjust the pitch thereof depending upon the greenness of the onion tops and selectively to vary the direction of the air under pressure as it leaves the said air outlet tube to strike the onions moving along the conveyor chain; a hood mounted over said air outlet tube and said onion topping mechanism; said hood having an outlet for the severed onion tops blown upwardly by air from said air outlet tube; said onion top outlet being disposed above said conveyor chain and in such relationship to said reciprocating blades and said air outlet tube so as to be in the path of the air blown through said air outlet tube; an adjustable air baffle plate mounted on said cutter bar of said knife assembly and being disposed within said hood; said baffle being positioned relatively to said onion top outlet of said hood to permit adjustment thereof to change the area of said onion top outlet; a single power means mounted on the machine to operate said conveyor, air blower apparatus and onion topping mechanism; and a power transmission means to operatively connect each of said conveyor chain, said air blower apparatus and said onion topping mechanism with said single power means.

3. In an onion topping machine provided with an endless conveyor chain passing under an onion topping mechanism, in combination, air blower apparatus mounted on the machine and having an air outlet tube disposed below said conveyor chain and in such relationship to said onion topping mechanism that onions passing along said conveyor chain are subjected to positive air pressure from said air blower apparatus sufficient to cause onions moving along said conveyor to stand with tops extending upwardly while passing thereunder; means carried by said air outlet tube for changing the direction of the air under pressure passing therethrough, a hood mounted over said air outlet tube and said onion topping mechanism, and said hood being provided with an onion top outlet.

4. In an onion topping machine provided with an endless conveyor chain passing under an onion topping mechanism, in combination, air blower apparatus mounted on the machine and having an air outlet tube disposed below said conveyor chain and in such relationship to said onion topping mechanism that onions passing along said conveyor chain are subjected to positive air pressure from said air blower apparatus sufficient to cause onions moving along said conveyor to stand with tops extending upwardly while passing thereunder; means carried by said air outlet tube for changing the direction of the air under pressure passing therethrough, a hood mounted over said air outlet tube and said onion topping mechanism, said hood being provided with an onion top outlet, and an adjustable air baffle plate carried by said onion topping mechanism and adapted to change the area of said onion top outlet.

5. In an onion topping machine provided with an endless conveyor chain passing under an onion topping mechanism, in combination, air blower apparatus mounted on the machine and having an air outlet tube disposed below said conveyor chain and in such relationship to said onion topping mechanism that onions passing along said conveyor chain are subjected to positive air pressure from said air blower apparatus sufficient to cause onions moving along said conveyor to stand with tops extending upwardly while passing thereunder, vanes mounted in said air outlet tube, a handle associated with said vanes to adjust the pitch thereof depending upon the greenness of the onion tops and selectively to vary the direction of the air under pressure as it leaves the said air outlet tube to strike the onions moving along said conveyor, a hood mounted over said air outlet tube and said onion topping mechanism, and said hood being provided with an onion top outlet.

6. In an onion topping machine provided with an endless conveyor chain passing under an onion topping mechanism, in combination, air blower apparatus mounted on the machine and having an air outlet tube disposed below said conveyor chain and in such relationship to said onion topping mechanism that onions passing along said conveyor chain are subjected to positive air pressure from said air blower apparatus sufficient to cause onions moving along said conveyor to stand with tops extending upwardly while passing thereunder, vanes mounted in said air outlet tube, a handle associated with said vanes to adjust the pitch thereof depending upon the greenness of the onion tops and selectively to vary the direction of the air under pressure as it leaves the said air outlet tube to strike the onions moving along said conveyor, a hood mounted over said air outlet tube and said onion topping mechanism, said hood being provided with an onion top outlet, and an adjustable air baffle plate carried by said onion topping mechanism and adapted to change the area of said onion top outlet.

References Cited in the file of this patent

UNITED STATES PATENTS

| | | |
|---|---|---|
| 2,007,098 | Peale | July 2, 1935 |
| 2,448,446 | LaPointe | Aug. 31, 1948 |
| 2,553,519 | Lenz | May 15, 1951 |

FOREIGN PATENTS

| | | |
|---|---|---|
| 629,943 | Great Britain | Sept. 30, 1949 |